(12) United States Patent
Gopal

(10) Patent No.: US 8,948,351 B2
(45) Date of Patent: Feb. 3, 2015

(54) METHODS, SYSTEMS AND COMPUTER PROGRAM PRODUCTS FOR ENHANCED CALL SCREENING

(75) Inventor: Rajesh Gopal, Flowermound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1025 days.

(21) Appl. No.: 12/251,086

(22) Filed: Oct. 14, 2008

(65) Prior Publication Data

US 2010/0091956 A1    Apr. 15, 2010

(51) Int. Cl.
*H04M 1/64* (2006.01)
*H04M 3/533* (2006.01)
*H04M 7/00* (2006.01)

(52) U.S. Cl.
CPC .............. *H04M 3/533* (2013.01); *H04M 7/006* (2013.01); *H04M 2203/4563* (2013.01)
USPC ....................... 379/88.22; 379/88.23; 455/413

(58) Field of Classification Search
USPC ............................................ 379/88.01–88.27
See application file for complete search history.

(56) References Cited

U.S. PATENT DOCUMENTS

| | | | |
|---|---|---|---|
| 5,651,054 A * | 7/1997 | Dunn et al. | 379/88.11 |
| 7,003,087 B2 * | 2/2006 | Spencer et al. | 379/211.01 |
| 7,035,385 B2 * | 4/2006 | Levine et al. | 379/88.23 |
| 7,050,559 B2 * | 5/2006 | Silver et al. | 379/211.02 |
| 7,672,440 B2 * | 3/2010 | Chen et al. | 379/209.01 |
| 2004/0240641 A1 * | 12/2004 | Cohen et al. | 379/88.22 |
| 2005/0201534 A1 * | 9/2005 | Ignatin | 379/88.22 |
| 2007/0274466 A1 * | 11/2007 | Tidwell et al. | 379/67.1 |
| 2008/0181141 A1 * | 7/2008 | Krantz et al. | 370/271 |
| 2008/0317221 A1 * | 12/2008 | Silver et al. | 379/88.08 |
| 2009/0028304 A1 * | 1/2009 | Burckart et al. | 379/88.23 |
| 2009/0240538 A1 * | 9/2009 | Sweeney et al. | 705/7 |

\* cited by examiner

*Primary Examiner* — Duc Nguyen
*Assistant Examiner* — Assad Mohammed

(57) ABSTRACT

This disclosure details the implementation of methods, systems and computer program products for enhanced call screening (hereinafter, "ECS"). ECS systems implement a live call screening application whereby users may hear voicemail messages in real time as they are being recorded, decide whether or not they wish to talk to the caller leaving the message, and engage the caller in two-way communications by indicating interest in doing so. In one embodiment, a method is disclosed, comprising: receiving a voicemail recording phase indicator, wherein the voicemail recording phase indicator indicates initiation of a recording phase for an incoming voice message by a voicemail server; establishing a communicative connection between the voicemail server and a call recipient device in response to the voicemail recording phase indicator; instructing transmission of a data stream from the voicemail server to the call recipient device via the communicative connection, the data stream comprising the incoming voice message in real-time recording progress.

27 Claims, 7 Drawing Sheets

US 8,948,351 B2

METHODS, SYSTEMS AND COMPUTER PROGRAM PRODUCTS FOR ENHANCED CALL SCREENING

BACKGROUND

Answering machines and services exist to assist telephone users in receiving calls that they are unavailable to answer or may have otherwise missed. A recording mode on an answering machine may switch on after a pre-set number of telephone rings have occurred without the call being picked up. During a recording phase, a pre-recorded message may be played for the caller, and then a digital or analog recording medium may be engaged while the caller speaks a message. In some cases with tape-recording answering machines, the caller's message may be played aloud by means of a speaker while the message is being recorded. More recently, cellular telephones and other digital telephony technologies have come about. These systems may employ answering services, whereby a missed call is relayed to a voice messaging server for recording and later retrieval.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION OF PREFERRED EMBODIMENTS

This disclosure details the implementation of methods, systems and computer program products for enhanced call screening (hereinafter, "ECS"). ECS systems implement a live call screening application whereby users may hear voicemail messages in real time as they are being recorded, decide whether or not they wish to talk to the caller leaving the message, and engage the caller in two-way communications by indicating interest in doing so. In one embodiment, a method is disclosed, comprising: receiving a voicemail recording phase indicator, wherein the voicemail recording phase indicator indicates initiation of a recording phase for an incoming voice message by a voicemail server; establishing a communicative connection between the voicemail server and a call recipient device in response to the voicemail recording phase indicator; instructing transmission of a data stream from the voicemail server to the call recipient device via the communicative connection, the data stream comprising the incoming voice message in real-time recording progress.

In another embodiment, a method is disclosed, comprising: receiving a voicemail recording phase indicator, wherein the voicemail recording phase indicator indicates initiation of a recording phase for an incoming voice message by a voicemail server; establishing a communicative connection to the voicemail server in response to the voicemail recording phase indicator; receiving a data stream via the communicative connection, wherein the data stream comprises the incoming voice message in recording progress; and providing the data stream for playback of the incoming voice message in recording progress.

It is to be understood that, depending on the particular needs and/or characteristics of an ECS user, administrator, voicemail server, data payload, monetization model, hardware configuration, network framework, and/or the like, various embodiments of the ECS may be implemented that enable a great deal of flexibility and customization. The instant disclosure discusses embodiments of the ECS primarily within the context of internet-enabled voice telephony. However, it is to be understood that the system described herein may be readily configured/customized for a wide range of other applications or implementations. For example, aspects of the ECS may be adapted for video messaging, computer-based communications, and/or the like applications. It is to be understood that the ECS may be further adapted to other implementations or communication and/or telephony applications.

Figure 1A:
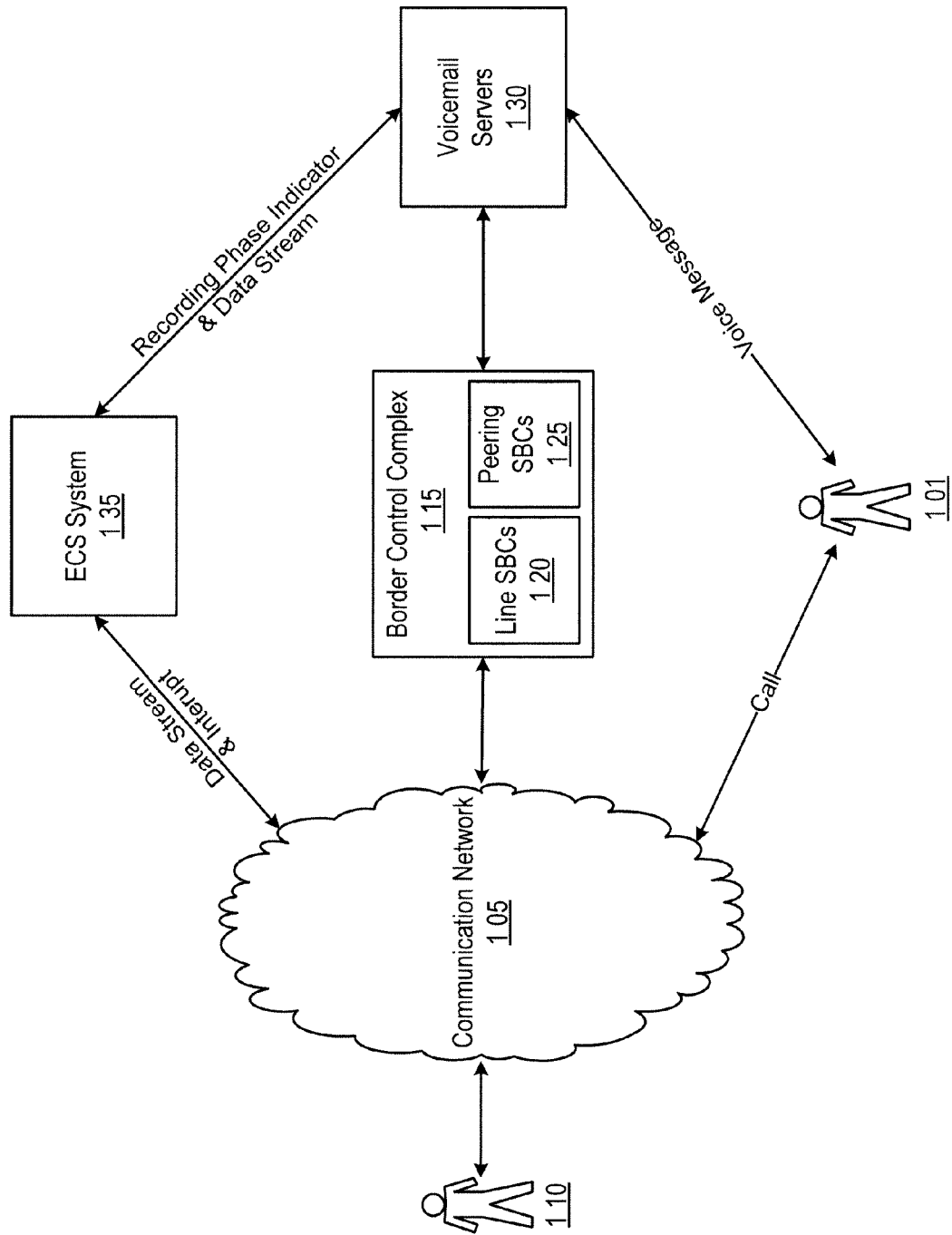
FIGS. 1A-1B provide an overview of an implementation of data flow between an ECS system and affiliated entities in one embodiment of ECS operation.
Figure 1B:
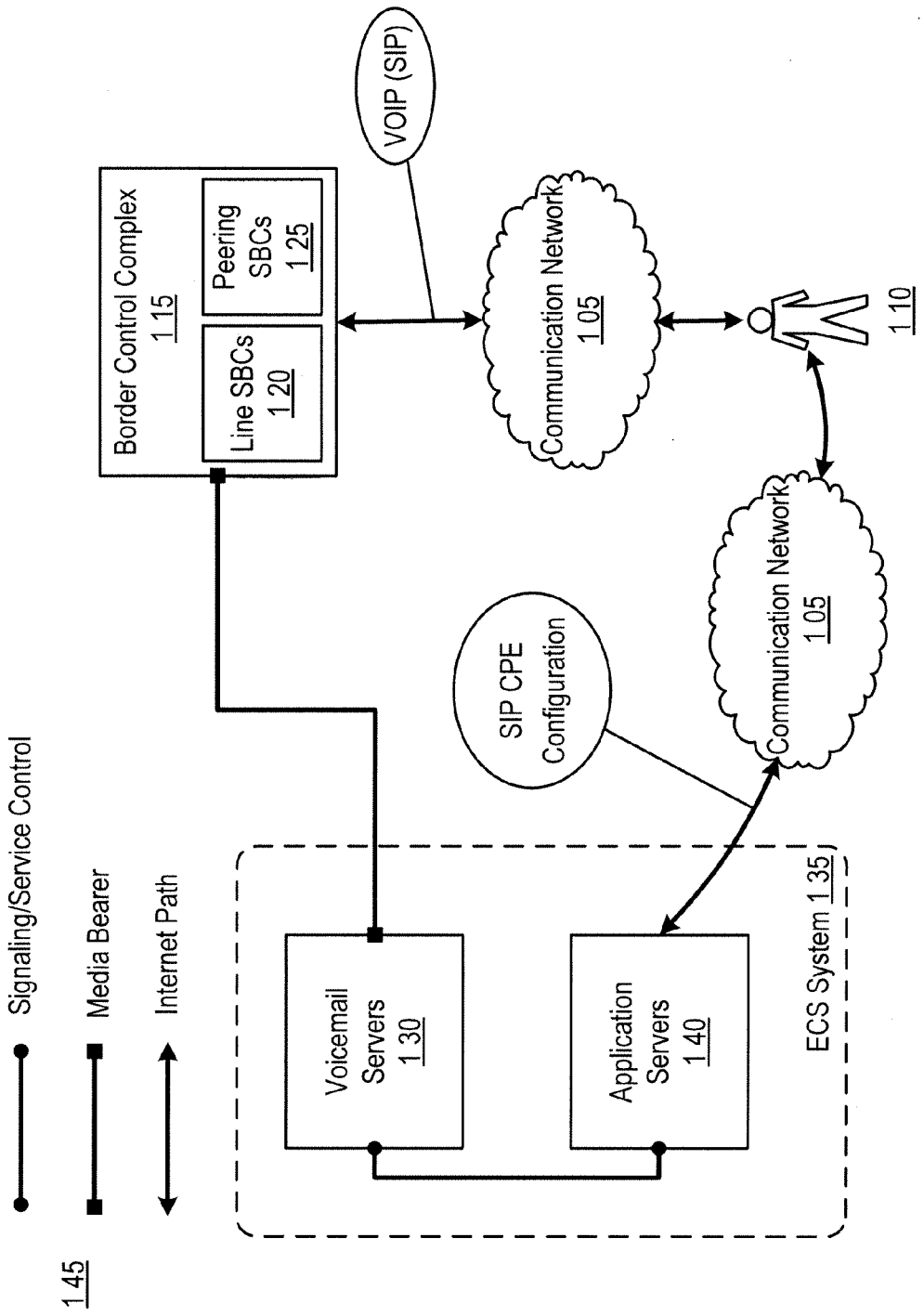

FIGS. 1A-1B provide an overview of an implementation of data flow between an ECS system and affiliated entities in one embodiment of ECS operation. In FIG. 1A, a caller 101 is shown initiating a call that is transmitted via a communications network 105 to a call recipient 110. The caller and/or call recipient may employ a wide variety of different communications devices within embodiments of ECS operation. For example, in one embodiment, devices such as an internet protocol (IP) enabled telephone, Verizon Fiber Optic Service (FiOS) television, a personal computer (PC), other IP-enabled communications devices, and/or the like may be employed. In another embodiment of the ECS, mobile phones may be employed by callers and/or call recipients and engaged by ECS functionality and/or services. If the call recipient 110 does not answer the call, then a voice messaging system may be triggered in order to record a message from the caller 101 for later retrieval by the call recipient 110. Within a Session Initiation Protocol (SIP) framework embodiment of the ECS, the call may be relayed via one or more session border controllers (SBCs) to one or more voicemail servers 130 for managing the receipt and recording of a caller voice message. In the illustrated implementation, SBCs, divided between line SBCs 120 and peering SBCs 125, are encapsulated in a border control complex 115. The voicemail server 130 may be configured to subsequently handle recording of the caller's 101 voice message. In one implementation, the voicemail server 130 may instruct the playback of a greeting message to the caller 101, indicating the initiation of a voice message recording phase. After the greeting message is complete, the voicemail server may begin recording a caller message.

At some point after the voicemail server 130 has been triggered, it may initiate a communication with the ECS system shown at 135. In one implementation, the communication may comprise an indication that a voice message recording phase is beginning or has begun. In one implementation, this indication may be sent to the ECS system 135 in the period of time during which the voicemail server 130 is transmitting a greeting message to the caller 101. Once the ECS system 135 has been triggered, a communication may be established between it and the voicemail server 130 in order for the ECS system to receive a data stream comprising the caller's voice message recording in real-time progress therefrom. The data stream and/or a re-formatted version of the voice message recording in progress may then be transmitted to the call recipient 110 for playback. In one implementation, the call recipient 110 may listen to the voice message as it is being recorded and decide if he or she desires to speak to the caller 101. If the desire exists, then the call recipient 110 may initiate a two-way communication with the caller 101 by providing an indication of the desire for that communication to the ECS system 135. Such an indication of desire may be provided in a wide variety of different ways within different implementations and/or embodiments of ECS operation. For example, in one implementation, a call recipient operating a telephone device having a handset may initiate a two-way communication with a caller by picking up the handset. In another implementation, one in which the call recipient operates a cellular telephone device, the two-way communication may be initiated by compressing a receiver button and/or other keypad button on the device. In still another implementation, one in which the call recipient engages the ECS system via a PC, the two-way communication may be initiated by selecting a graphical user interface (GUI) widget with a mouse pointer. When the two-way communication has been selected, the call recipient 110 and caller 101 may be connected as though the call recipient had answered the caller's call in the first place, prior to initiation of the voice message recording phase.

In some embodiments, an ECS system may be integrated with a call recipient communications and/or telephony device. In alternative embodiments, various other ECS affiliated entities, such as voicemail servers, session border controllers, border control complexes, and/or the like may be integrated with and/or within the ECS system and/or other ECS components. For example, the embodiment illustrated in FIG. 1B shows the ECS system 135 incorporating both voicemail servers 130 and application servers 140, the former implementing the recording of voicemails and associated functions and/or services and the latter implementing the delivery of live voice message recording in progress to call recipients 110 and/or a call recipient device. FIG. 1B further illustrates different communicative couplings between various ECS components and/or affiliated entities in one embodiment of ECS operation, with a key delineating the different couplings shown at 145. In the illustrated implementation, the call recipient 110 and/or others users, callers, and/or the like may be connected to a border control complex 115, comprising line SBCs 120 and/or peering SBCs 125, by an internet path that may be mediated by a communication network 105. The internet path shown may employ voice-over Internet Protocol (VOIP), SIP, and/or the like for configuring communications and/or data exchanges. The Border Control Complex 115 is shown as coupled to the voicemail server component 130 of the ECS system 135 by means of a media bearer path. The voicemail servers 130, in turn, are shown as coupled to the application servers 140 by means of a signaling and/or service control path. Finally, the application servers 140 are shown as coupled to the call recipients 110 via an internet path, such as may be mediated by a communications network 105. Communications, data exchanges, and/or the like between the application servers 140 and the call recipients 110 or other users may, in one implementation, be configured based on one or more SIP customer-premises equipment (CPE) formats.

Figure 2:
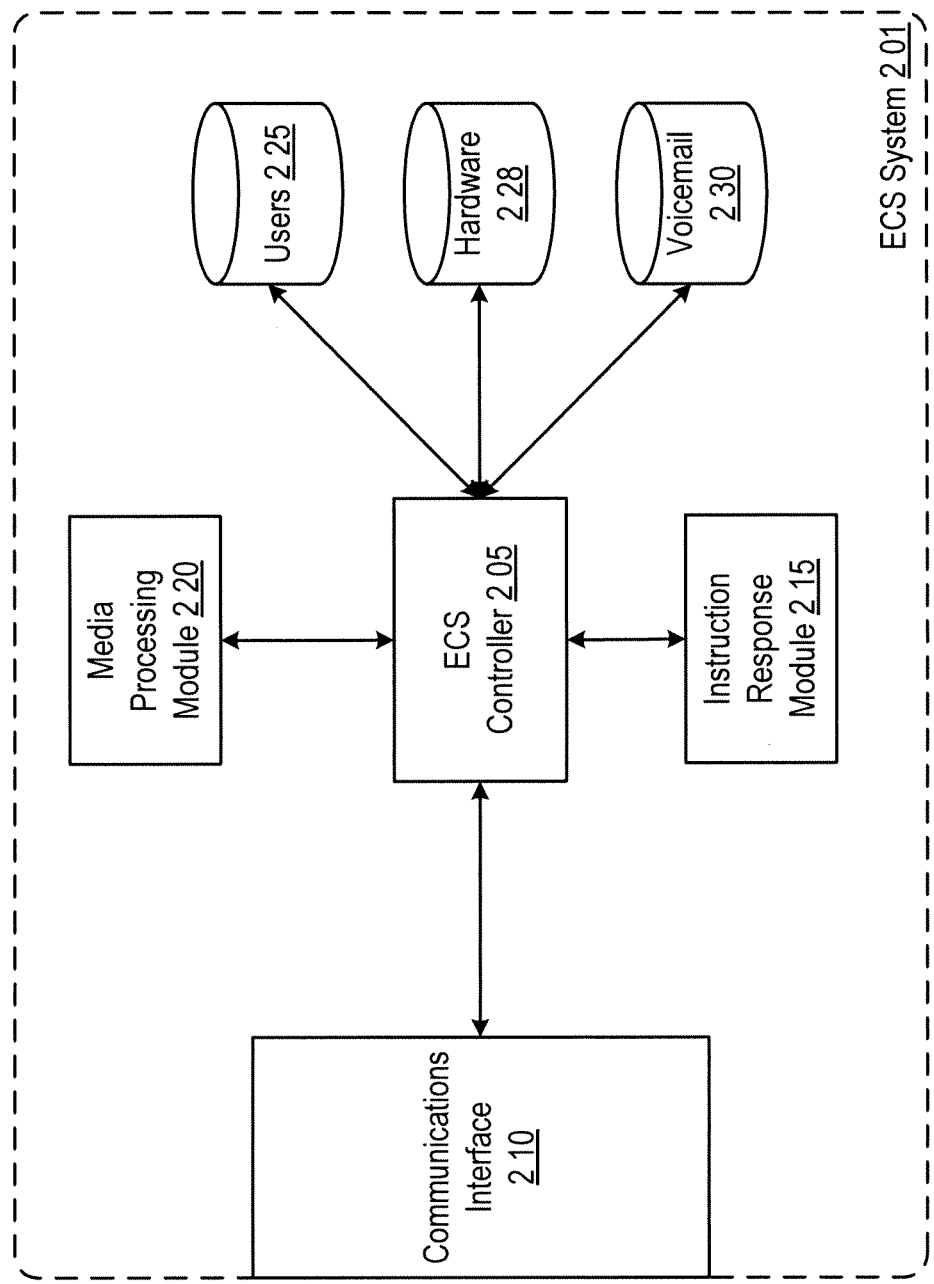
FIG. 2 shows an implementation of ECS system components in one embodiment of ECS operation.

FIG. 2 shows an implementation of ECS system components in one embodiment of ECS operation. The ECS system 201 may contain a number of functional modules and/or data stores. A ECS controller 205 may serve a central role in some embodiments of ECS operation, serving to orchestrate the reception, generation, and distribution of data and/or instructions, to, from, and between ECS modules and/or mediate communications with external entities and systems.

In one embodiment, the ECS controller 205 may be housed separately from other modules and/or databases within the ECS, while in another embodiment, some or all of the other modules and/or databases may be housed within and/or configured as part of the ECS controller. Further detail regarding implementations of ECS controller operation, modules, and databases is provided below.

In the implementation illustrated in FIG. 2, the ECS controller 205 may be configured to couple to external entities via a communications interface 210. The communications interface may, for example, configure data received from the ECS controller 205 and/or any of a variety of external entities for receipt and/or transmission to other entities and/or ECS components. In various implementations, a communications interface 210 may, for example, serve to configure data into application, transport, network, data link, and/or physical layer formats in accordance with a TCP/IP communications model. The communications interface 210 may further be configurable to implement and/or translate SIP, SIP CPE, VOIP, and/or the like data formats and/or protocols. The communications interface may further house one or more ports, jacks, antennas, and/or the like to facilitate wired and/or wireless communications with and/or within the ECS system.

In one implementation, he ECS controller 205 may further be coupled to a plurality of modules configured to implement ECS functionality and/or services. An instruction response module 215 may, in one implementation, be configurable to receive and/or process an indicator sent by one or more voicemail servers that a voice message recording phase has commenced and to initiate a response thereto. For example, the instruction response module 215 may receive a pre-specified signal from a voicemail server, based on which it may send a response instruction to the voicemail server to initiate a transfer, data stream, and/or the like of a caller's voice message recording in progress. The instruction response module 215 may, in one implementation, be further configurable to receive and/or process an indicator sent by a call recipient that he or she desires to interrupt a voice message recording in progress and initiate a two-way communication with a caller leaving that voice message (i.e., to answer the call) and to initiate a response thereto. For example, the instruction response module 215 may receive a pre-specified signal from a call recipient (e.g., an indication that a receiver button has been pressed on a call recipient's telephone device) and may initiate the establishment of a two-way communication channel between the caller and the call recipient and/or initiate the termination of the transmission of the voice message recording in progress from a voicemail server to the call recipient. A media processing module 220 may, in one implementation, be configurable to receive and/or process data pertaining to one or more voice message recordings in progress for transmission to one or more call recipients. The media processing module 220 may, for example, receive voice message recording data in one form and convert it into a data stream suitable for transmission to a call recipient device, CPE, and/or the like. In one implementation, the media processing module 220 may implement one or more data transmission and/or communication protocols for sent and/or received data.

In one implementation, the ECS controller 205 may further be coupled to one or more databases configured to store and/or maintain ECS data. A users database 225 may contain information pertaining to callers and/or call recipients, contact information, profile information, identities of hardware devices, CPEs, and/or the like associated with users, service preferences, system settings, and/or the like. A hardware database 228 may contain information pertaining to hardware devices with which the ECS system may communicate, such as but not limited to voicemail servers, user telephony devices, CPEs, gateways, routers, and/or the like. The hardware database 228 may specify transmission protocols, data formats, and/or the like suitable for communicating with hardware devices employed by any of a variety of ECS affiliated entities. A voicemail database 230 may contain data pertaining to voice messages recorded previously and/or recording in progress. In one implementation, the voicemail database 230 may serve as a temporary repository for voicemail data intermediate between one or more voicemail servers and one or more call recipients.

Figure 3A:
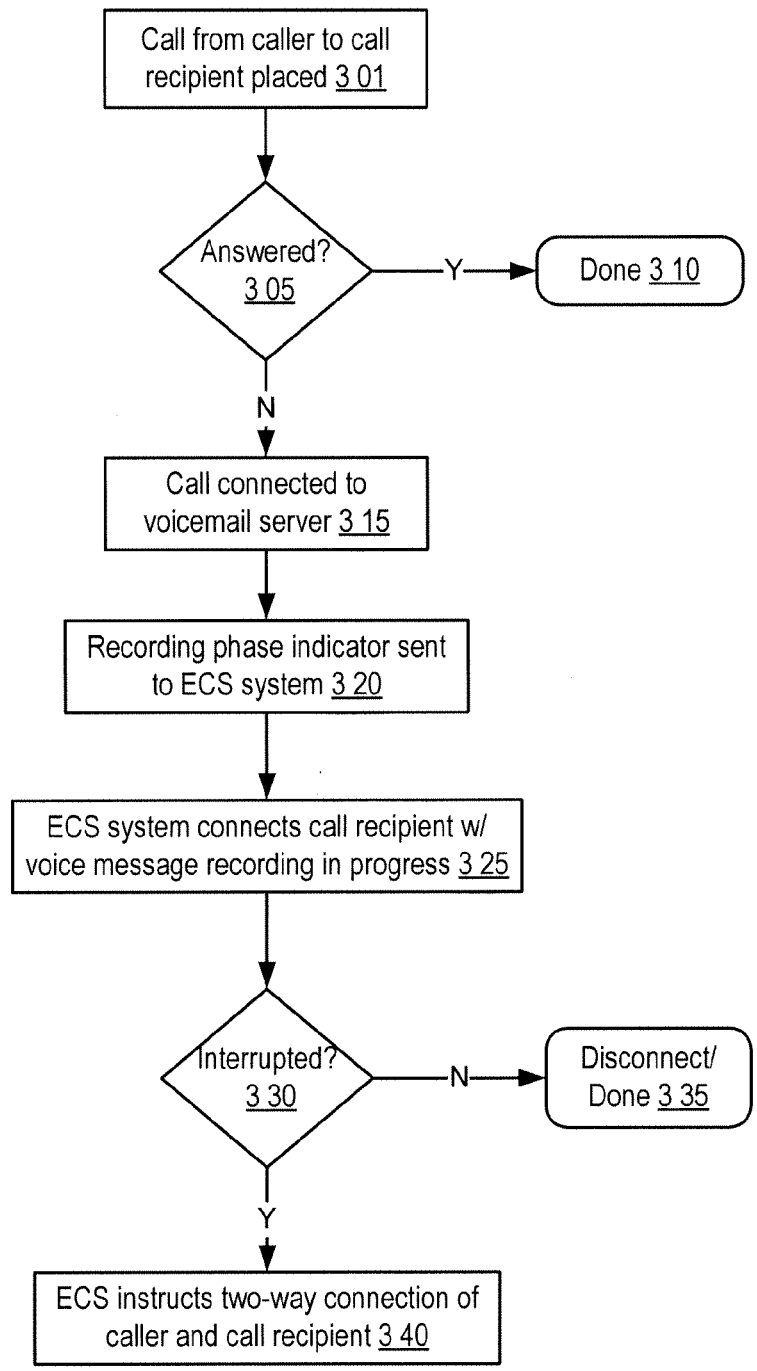
FIGS. 3A-3B show implementations of logic flow in two embodiments of ECS operation.
Figure 3B:
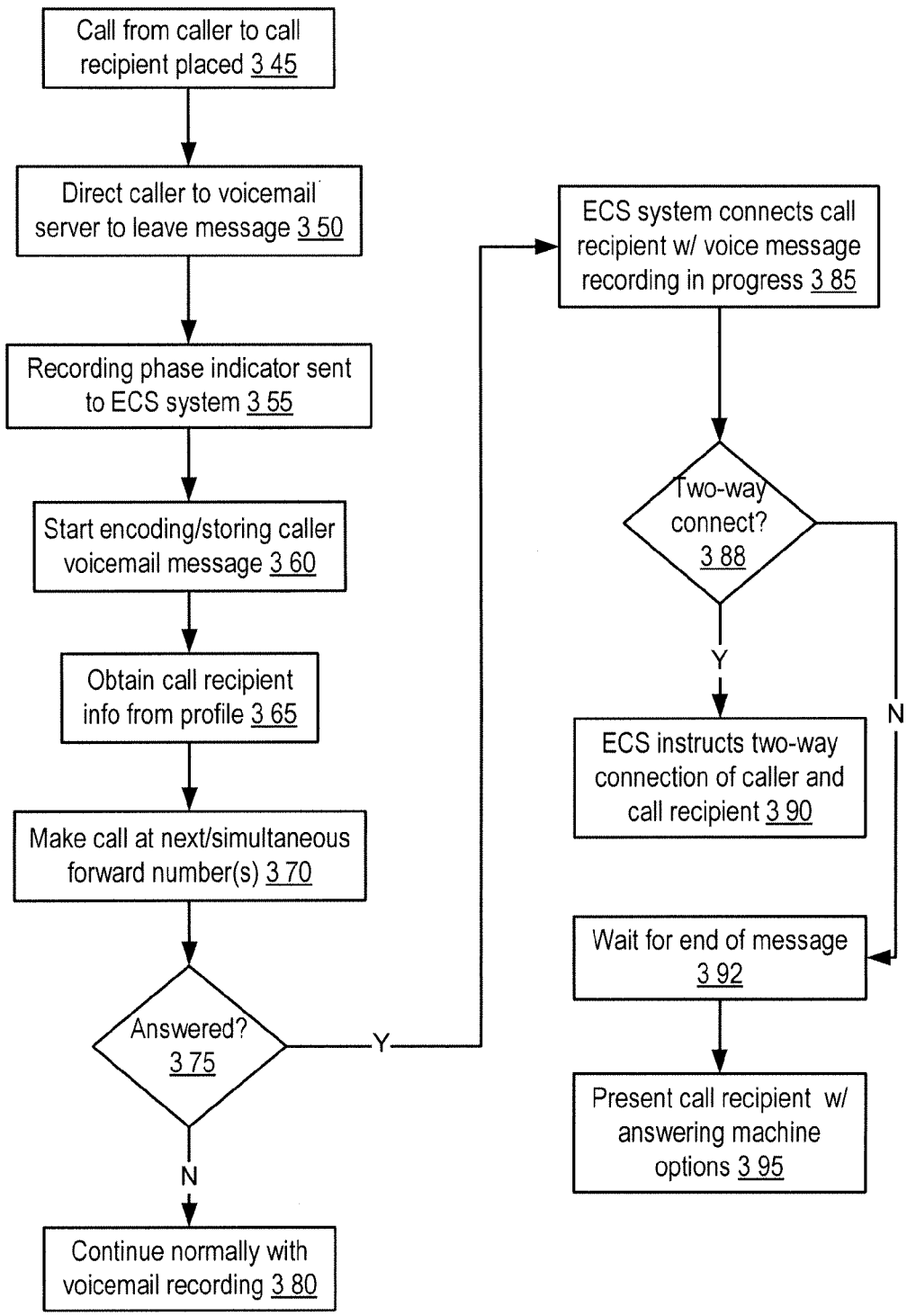

FIGS. 3A-3B show implementations of logic flow in two embodiments of ECS operation. In FIG. 3A, a call may initially be placed from a caller to a call recipient 301. A wide variety of different communication devices may be employed by the caller and/or call recipient, including but not limited to IP-enabled telephony devices, VOIP telephones, PCs, FiOS televisions, cell phones, and/or the like. A determination is made at 305 as to whether the call has been answered by the call recipient. If so, no answering service is engaged, the call proceeds normally, and the flow is done 310. On the other hand, if the caller does not answer the call after a specified number of rings, the call may be connected to a voicemail service and/or server 315 in order to initiate a voice message recording phase allowing the caller to leave a message for the call recipient who has not answered the call. Handling of the voice message recording by the voicemail server may, in one implementation, including playing of a greeting message for the caller (e.g., a message pre-recorded by the call recipient), after which the voicemail server may initiate recording of the caller's message. The voicemail server and/or an affiliated device may transmit a recording phase indicator to the ECS system and/or an ECS system component 320 in order to trigger an appropriate response therefrom. In one implementation, the voicemail server may be configured to transmit the recording phase indicator while a greeting message is being played to the caller. This may serve to reduce any lag time between the caller speaking his or her voice message and the call recipient hearing the voice message recording in progress. A recording phase indicator may take a variety of different forms within various implementations and/or embodiments of ECS operation. In one implementation, a recording phase indicator may comprise a pre-designated signal recognizable by the ECS system and/or ECS system components to trigger the initiation of ECS services and/or functionality.

In response to the recording phase indicator, the ECS system may connect the call recipient with the voice message recording in progress 325, such as by directing the voicemail server to transmit the voice message recording in progress directly thereto and/or via one or more intermediary agencies. In one implementation, the ECS system may first present the call recipient with an option as to whether or not he or she wishes to hear the voice message recording in progress and/or to receive the associated data stream. For example, the ECS system may generate and/or send to the call recipient a user interface screen with a selectable option displayed thereon. In one implementation, the ECS system may serve as the intermediary agency, receiving voice message data from the voicemail server and relaying it to the call recipient and/or a call recipient device. In one implementation, the ECS system may further process and/or format voice message data before providing the data to the call recipient (e.g., converting the data into a data stream, formatting the data for receipt by a particular call recipient device, implementing one or more transmission protocols, and/or the like). In an alternative implementation, the ECS system may establish a three-way connection between the caller, call recipient, and the voicemail server.

A determination may then be made as to whether the call recipient has provided an indication of a desire to interrupt the voice message recording in progress and/or to communicate directly with the caller 330. To make such a determination, a call recipient may be provided and/or presented with a user interface notification screen indicating playback of the incoming voice message recording and/or requesting user input or interaction to interrupt the voice message. The call recipient may interrupt the voice message recording in progress and seek to establish two-way communication with the caller by, for example, lifting a device handset, pressing a device button, selecting a graphical user interface widget, and/or the like. If the voice message recording is left uninterrupted, it may proceed to completion, and the ECS system may disconnect from the call recipient, voicemail server, and/or the like 335. If, however, the call recipient provides an indication of a desire to interrupt the voice message recording in progress, the ECS system may instruct the establishment of a two-way connection between the caller and the call recipient to allow them to communicate directly with one another 340. In one implementation, the two-way connection that is established is substantially the same as a connection that would be established had the call recipient answered the call in the first place prior to engagement of the voicemail service and/or servers.

FIG. 3B shows an implementation of logic flow in another embodiment of ECS operation. A call may be placed from a caller to a call recipient 345. If the call is not answered by the call recipient, the caller and/or a caller device may be directed and/or connected to one or more voicemail servers to facilitate the leaving of a message by the caller for the call recipient 350. Initiation of a recording phase by a voicemail server may trigger the sending of a recording phase indicator to the ECS system 355. As discussed previously, a recording phase indicator may, in one implementation, comprise a pre-designated electronic signal and/or encoded message, and may, in one implementation, be sent to the ECS server during playback of a pre-recorded message to the caller prior to the initiation of voice message recording. A voicemail message received by the caller may then be encoded and/or stored by the one or more voicemail servers 360. The ECS server may also obtain call recipient information from a profile 365, such as may be stores in a users database (see FIG. 5), in order to ascertain one or more forwarding addresses, numbers, and/or the like to which the ECS system may stream the voice message recording in progress. For example, while the caller may initially be trying to call the call recipient on his or her home phone, the ECS server may direct the voice message recording in progress to the call recipient's cellular telephone, blackberry, PC, and/or the like. In one implementation, a call recipient may specify forwarding number priorities, designating the order and/or importance with which various forwarding numbers and/or addresses should be tried by the ECS system. In another implementation, a call recipient may specify forwarding number authorization levels, designating a required caller authorization level for trying each forwarding number. For example, all forwarding numbers may be designated for calls from a family member, while only a work phone and work cell phone may be designated to calls originating from a workplace. In still another implementation, a call recipient may specify time periods during which particular forwarding numbers should be tried by the ECS system (e.g., mobile phone between 8 AM and 9:30 AM, work telephone between 9:30 AM and 6 PM, etc.).

The ECS system may then make a call and/or otherwise attempt to connect to one or more forward numbers as obtained from the profile 370. In one implementation, the ECS system may try all forwarding numbers simultaneously. This implementation may serve to reduce lag time between recording of the voice message and the call recipient's receipt of that voice message recording in progress. In another implementation, the ECS system may try forwarding numbers in sequence, such as in an order that may be specified by a forwarding number priority obtained from a call recipient profile. A determination is made as to whether the call to any forwarding number has been answered 375. If not, then the ECS system may allow the voicemail recording to continue normally 380. Otherwise, the ECS system may connect the call recipient with the voice message recording in progress 385. In one implementation, the ECS system may establish a three-way connection between the voicemail server, the caller and/or a caller device, and the call recipient and/or a call recipient device. In another implementation, the ECS server may act as an intermediary to receive voice message data from the voicemail server and relay it to the call recipient and/or a call recipient device.

A determination may be made as to whether or not the call recipient desires to connect directly to the caller to facilitate two-way communication 388. In one implementation, the ECS system may present the option to the call recipient by means of an interface screen. In another implementation, the call recipient may register the desire for two-way communication by executing a pre-defined action on the call recipient device (e.g., lifting a handset, compressing a keypad key, selecting a graphical user interface element with a mouse pointer, and/or the like). If the desire for two-way communication is registered, then the ECS system may instruct the facilitation and/or establishment of a two-way communication connection between the caller and the call recipient 390. In one implementation, the call recipient's registration of desire to engage in two-way communication may cause recording of the voice message to be interrupted. In another implementation, the voicemail server may continue to record the two-way communication between the caller and the call recipient. If the call recipient does not indicate a desire to establish a two-way connection, then the voicemail server and/or ECS system may wait for the completion of the voice message recording 392 and present the call recipient with one or more answering machine options 395 such as, but not limited to, replaying, forwarding, saving, and/or deleting the voice message.

Figure 4:
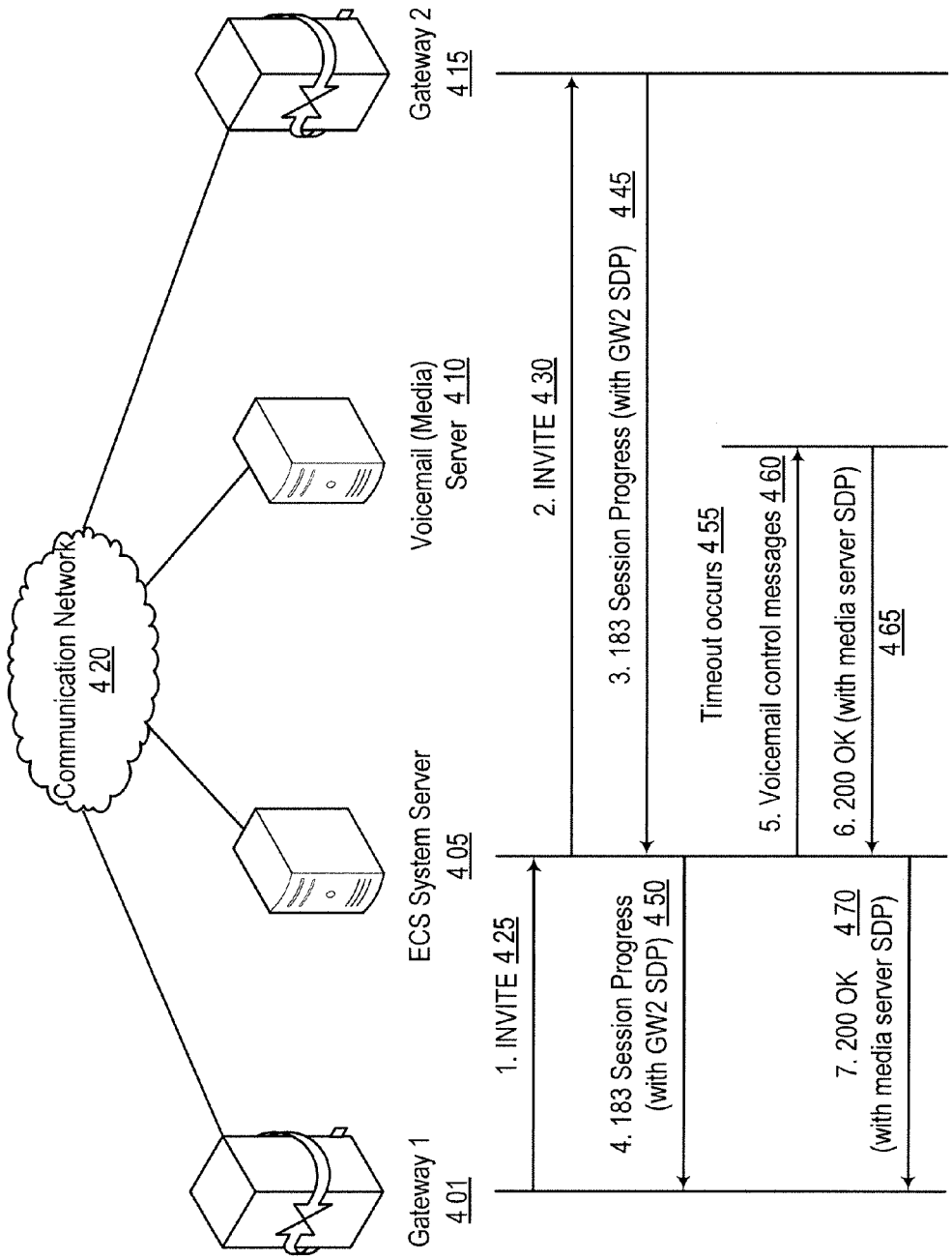
FIG. 4 shows aspects of an implementation of combined logic and data flow for call setup and voicemail in embodiments of ECS operation.

FIG. 4 shows aspects of an implementation of combined logic and data flow for call setup and voicemail in embodiments of ECS operation. The figure shows an implementation of communications between two gateway systems (401 and 415), an ECS system server 405, and a voicemail (media) server 410 (e.g., uOne) via a communication network 420. The implementation illustrated in FIG. 4 employs SIP protocols. At 425, gateway 1 401 sends an INVITE message to the ECS system server 405 which, in turn, sends an INVITE message 430 to gateway 2 415. Gateway 2 415 then sends a 183 Session Progress message 445 to the ECS system server 405 which passes a 183 Session Progress message 450 to gateway 1 401. In one implementation, one or both 183 Session Progress messages may include and/or be configured with session description protocol (SDP) messages. A timeout occurs 455, after which the ECS system server 405 sends one or more voicemail control messages 460 to the voicemail server 410. The voicemail server 410, in turn, sends a 200 OK message 465 to he ECS system server 405, and the ECS system server 405 sends a 200 OK message to gateway 1 401. In one implementation, one or both 200 OK messages may be configured with and/or include voicemail (media) server SDP messages.

An implementation of a table, listing messages and/or instructions that may be passed between and/or among various entities such as those shown in FIG. 4 is shown below. in one embodiment of ECS operation. The table includes an action column listing specific messages and/or instructions, and a description column providing additional description of each action.

| | Action | Description |
|---|---|---|
| 1 | INVITE-SIP gateway 1 to application server | SIP gateway 1 sends an INVITE request to the application server. |
| 2 | INVITE-Application server to SIP gateway 2 | The application server sends the INVITE request to SIP gateway 2. |
| 3 | 183 Session Progress-SIP gateway 2 to application server | SIP gateway 2 sends a 183 Session Progress message to the application server. |
| 4 | 183 Session Progress-Application server to SIP gateway 1 | The application server proxies the 183 Session Progress message to SIP gateway 1. |
| | At this point, a timeout occurs. | |
| 5 | Voice Mail control messages-Application server to uOne server | The application server forwards voice mail control messages to the uOne server (media server). |
| 6 | 200 OK-uOne server to application server | The uOne server sends a 200 OK response to the application server. In the 200 OK response, the uOne server SDP is included. |
| 7 | 200 OK response-Application server to SIP gateway 1 | The application server proxies the 200 OK response to the SIP gateway. In the 200 OK response, the uOne server SDP is included. |

ECS Controller

Figure 5:
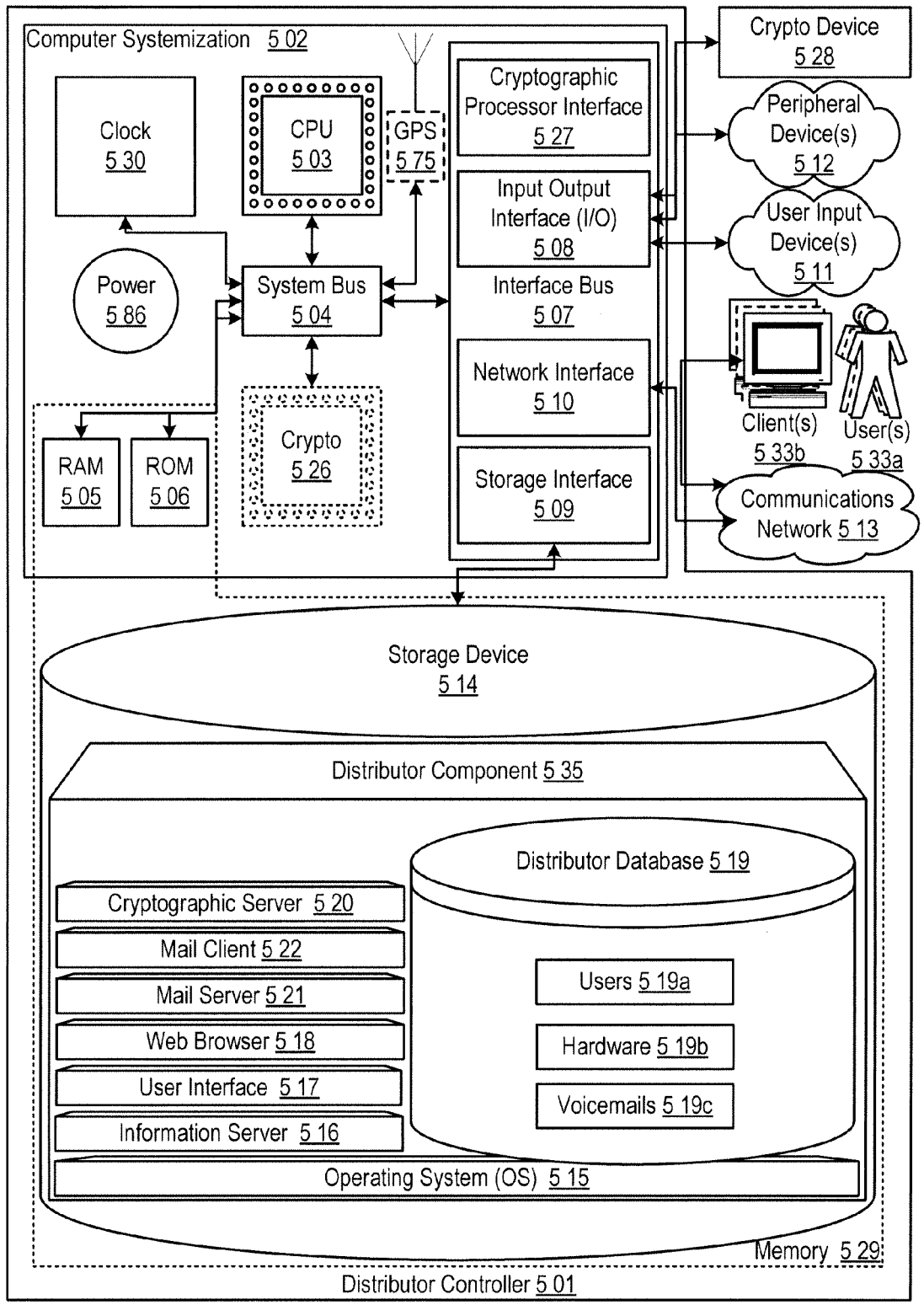
FIG. 5 is of a block diagram illustrating exemplary embodiments of a Manager controller.

FIG. 5 of the present disclosure illustrates inventive aspects of a ECS controller 501 in a block diagram.

Typically, users, which may be people and/or other systems, engage information technology systems (e.g., commonly computers) to facilitate information processing. In turn, computers employ processors to process information; such processors are often referred to as central processing units (CPUs). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the ECS controller 501 may be connected to and/or communicate with entities such as, but not limited to: one or more users from user input devices 511; peripheral devices 512; a cryptographic processor device 528; and/or a communications network 513.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ECS controller 501 may be based on common computer systems that may comprise, but are not limited to, components such as: a computer systemization 502 connected to memory 529.

Computer Systemization

A computer systemization 502 may comprise a clock 530, central processing unit (CPU) 503, a read only memory (ROM) 506, a random access memory (RAM) 505, and/or an interface bus 507, and most frequently, although not necessarily, the foregoing are all interconnected and/or communicating through a system bus 504. Optionally, the computer systemization may be connected to an internal power source 586. Optionally, a cryptographic processor 526 and/or a global positioning system (GPS) component 575 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s). The CPU interacts with memory through signal passing through conductive conduits to execute stored signal program code according to conventional data processing techniques. Such signal passing facilitates communication within the ECS controller and beyond through various interfaces. Should processing requirements dictate a greater amount of speed, parallel, mainframe and/or super-computer architectures may similarly be employed. Alternatively, should deployment requirements dictate greater portability, smaller Personal Digital Assistants (PDAs) may be employed.

Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the ECS thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(es) 507 may accept, connect, and/or communicate to a number of interface adapters, conventionally although not necessarily in the form of adapter cards, such as, but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/ or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the ECS controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the ECS controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the ECS controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allow for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 529. However, memory is a fungible technology and resource; thus, any number of memory embodiments may be employed in lieu of or in concert with one another. It is to be understood that the ECS controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., CD ROM/RAM/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the ECS component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the ECS controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ECS controller to communicate with other entities through a communications network 513. Various communication protocols may be used by the ECS controller as a subcarrier transport mechanism for interaction, such as, but not limited to: multicast, TCP/IP, UDP, unicast, and/or the like.

Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, Java, JavaScript, Practical Extraction Report Language (PERL), Hypertext Pre-Processor (PHP), pipes, Python, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ECS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ECS database 519, operating systems, other program components, user interfaces, Web browsers, and/or the like.

Access to the ECS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ECS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ECS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/Vista (i.e., Aero)/XP, or Unix's X-Windows (e.g., which may include additional Unix graphic interface libraries and layers such as K Desktop Environment (KDE), mythTV and GNU Network Object Model Environment (GNOME)), provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact with, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Some Web browsers allow for the execution of program components through facilities such as Java, JavaScript, ActiveX, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the ECS enabled nodes. The combined application may be nugatory on systems employing standard Web browsers.

Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ECS.

Access to the ECS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ECS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ECS component to engage in secure transactions if so desired. The cryptographic component facilitates the secure accessing of resources on the ECS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ECS Database

The ECS database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ECS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data, but may have other types of functionality encapsulated within a given object. If the ECS database is implemented as a data-structure, the use of the ECS database 519 may be integrated into another component such as the ECS component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-c. A Users table 519a may include fields such as, but not limited to: user_ID, user_name, contact_info, hardware_ID, mobile_device_type, usage_history, and/or the like. A Hardware table 519b may include fields such as, but not limited to: hardware_ID, hardware_type, hardware_name, data_formatting_requirements, protocols, addressing_info, usage_history, hardware_requirements, user_ID, and/or the like. A Voicemail table 519b may include fields such as, but not limited to: voicemail_ID, caller_ID, call recipient_ID, user_ID, voicemail data, formatting_metadata, time, date, source, destination, and/or the like. These tables may support and/or track multiple entity accounts on the ECS controller.

In one embodiment, the ECS database may interact with other database systems. For example, employing a distributed database system, queries and data access by search ECS component may treat the combination of the ECS database, an integrated data security layer database as a single database entity.

In one embodiment, user programs may contain various user interface primitives, which may serve to update the ECS. Also, various accounts may require custom database tables depending upon the environments and the types of clients the ECS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519a-c. The ECS may be configured to keep track of various settings, inputs, and parameters via database controllers.

The ECS database may communicate to and/or with other components in a component collection, including itself, and/or facilities of the like. Most frequently, the ECS database communicates with the ECS component, other program components, and/or the like. The database may contain, retain, and provide information regarding other nodes and data.

The ECS Component

The ECS component 535 is a stored program component that is executed by a CPU. In one embodiment, the ECS component incorporates any and/or all combinations of the aspects of the ECS that was discussed in the previous figures. As such, the ECS affects accessing, obtaining and the provision of information, services, transactions, and/or the like across various communications networks.

The ECS component is configurable to access, calculate, engage, exchange, generate, identify, instruct, match, process, search, serve, store, and/or facilitate communication channels between ECS components and/or affiliated entities, transmission of voice message recording in progress to and among callers and/or call recipients, enhanced call screening, and/or the like and use of the ECS.

The ECS component enabling access of information between nodes may be developed by employing standard development tools and languages such as, but not limited to: Apache components, Assembly, ActiveX, binary executables, (ANSI) (Objective-) C (++), C# and/or NET, database adapters, CGI scripts, Java, JavaScript, mapping tools, procedural and object oriented development tools, PERL, PHP, Python, shell scripts, SQL commands, web application server extensions, WebObjects, and/or the like. In one embodiment, the ECS server employs a cryptographic server to encrypt and decrypt communications. The ECS component may communicate to and/or with other components in a component collection, including itself, and/or facilities of the like. Most frequently, the ECS component communicates with the ECS database, operating systems, other program components, and/or the like. The ECS may contain, communicate, generate, obtain, and/or provide program component, system, user, and/or data communications, requests, and/or responses.

Distributed ECSs

The structure and/or operation of any of the ECS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ECS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A method, comprising:
    receiving voicemail recording phase indicators, wherein each of the voicemail recording phase indicators indicates initiation of a recording phase for a respective incoming voice message by a voicemail server;
    selecting at least one call recipient device from a plurality of call recipient devices in response to each of the voicemail recording phase indicator, wherein each of the plurality of call recipient devices is prioritized in accordance with a call recipient profile;
    establishing a first communicative connection between the voicemail server and the at least one call recipient device in response to the selection of the at least one call recipient device; and
    establishing a second communicative connection, independent from the first communicative connection, to the at least one call recipient device in response to each of the voicemail recording phase indicators;
    instructing transmission by a media processing module of a plurality of data streams from the voicemail server to the at least one call recipient device via the first communicative connection, each of the data streams comprising one of the incoming voice messages in real-time recording progress;
    receiving an interruption indicator from the at least one call recipient device after instructing the transmission of data; and
    establishing a two-way communicative connection between the at least one call recipient device and a caller device in response to receipt of the interruption indicator.

2. The method of claim 1, wherein the instructing transmission of a data stream from the voicemail server to the at least one call recipient device further comprises:

receiving a data stream via the first communicative connection; and providing the data stream to the at least one call recipient device.

3. The method of claim 1, wherein the receiving a voicemail recording phase indicator, establishing the first communicative connection, and instructing transmission are performed by the at least one call recipient device.

4. The method of claim 3, further comprising:
playing the incoming voice message in real-time recording progress via a speaker.

5. The method of claim 1, wherein
receiving the voice message interruption indicator from the at least one call recipient device; and
establishing the two-way communicative connection between the at least one call recipient device and a caller device in response to the voice message interruption indicator.

6. The method of claim 1, wherein the at least one call recipient device comprises an internet protocol telephone.

7. The method of claim 1, wherein the at least one call recipient device comprises a fiber optic service television.

8. The method of claim 1, wherein the at least one call recipient device comprises a personal computer.

9. The method of claim 1, wherein instructing transmission of a data stream is configured in accordance with a session initiation protocol.

10. The method of claim 1, wherein the instructing transmission of a data stream further comprises:
instructing configuration of the data stream in accordance with a hardware-specific data format based on a hardware profile associated with the at least one call recipient device, wherein the hardware profile is linked to a call recipient profile.

11. A method, comprising:
receiving voice message recording requests to begin recording a respective incoming voice message;
sending a voicemail recording phase indicator to a remote server in response to the voice message recording request;
selecting at least one call recipient device from a plurality of call recipient devices in response to each of the voicemail recording phase indicators, wherein each of the plurality of call recipient devices is prioritized in accordance with a call recipient profile;
establishing a first communicative connection between the voicemail server and the at least one call recipient device in response to the selection of the at least one call recipient device based on an instruction from the remote server;
establishing a second communicative connection, independent from the first communicative connection, to the at least one call recipient device in response to each of the voicemail recording phase indicators;
transmitting from a media processing module to the at least one call recipient device a plurality data streams each comprising one of the incoming voice messages in real-time recording progress;
receiving an interruption indicator from the at least one call recipient device after initiating transmission of the data stream; and
establishing a two-way communicative connection between the at least one call recipient device and a caller device in response to receipt of the interruption indicator.

12. The method of claim 11, further comprising: sending a pre-recorded greeting message for playback on a caller device.

13. The method of claim 12, wherein the sending a voicemail recording phase indicator to a remote server occurs while sending the pre-recorded greeting message.

14. A method, comprising:
connecting via a first communicative link to a voicemail server based on a first instruction from a remote server, wherein the first instruction from the remote server is sent based to the selection of the at least on call recipient device at the remote server;
connecting via a second communicative link, independent from the first communicative link, to the at least one call recipient device from a plurality of call recipient devices in response to the voicemail recording phase indicator, and wherein the at least one call recipient device comprises at least two call recipient devices, each of the plurality of call recipient devices is prioritized in accordance with a call recipient profile, and sequentially establishing the communicative connection between the voicemail server and each of the at least two call recipient devices in accordance with at least one of authorization level priorities, order priorities, importance priorities, and time period forwarding priorities, wherein each priority is derived from the call recipient profile;
receiving data streams of incoming voice messages in real-time recording progress from the voicemail server;
instructing configuration of the data streams in accordance with a hardware-specific data format based on a hardware profile associated with the at least one call recipient device, wherein the hardware profile is linked to a call recipient profile;
receiving an interruption indicator from the at least one call recipient device after initiation of transmission of the data stream; and
establishing a two-way communicative connection between the at least one call recipient device and a caller device in response to receipt of the interruption indicator.

15. The method of claim 14, further comprising:
playing the incoming voice message in real-time recording progress via a speaker.

16. The method of claim 14, further comprising:
sending a voice message interruption indicator to the remote server; and
connecting to a cell sender device via a two-way communication link based on a second instruction from the remote server sent in response to the voice message interruption indicator.

17. The method of claim 16, wherein the voice message interruption indicator is sent in response to a call recipient action.

18. The method of claim 17, wherein the call recipient action comprises lifting of a handset.

19. The method of claim 17, wherein the call recipient action comprises compression of a keypad button.

20. The method of claim 17, wherein the action comprises selection of a graphical user interface widget by a mouse pointer.

21. A system, comprising:
a processor;
a memory in communication with the processor and containing program instructions;
an input and output in communication with the processor and memory comprising a graphical interface;

wherein the processor executes program instructions contained in the memory, and the program instructions comprise instructions that when executed by the processor cause the processor to:

receive voicemail recording phase indicators, wherein each of the voicemail recording phase indicators indicates initiation of a recording phase for a respective one of incoming voice messages by a voicemail server;

select at least one call recipient device from a plurality of call recipient devices in response to each of the voicemail recording phase indicators, wherein each of the plurality of call recipient devices is prioritized in accordance with a call recipient profile;

establish a first communicative connection between the voicemail server and the at least one call recipient device in response to the selection of the at least one call recipient device;

establish a second communicative connection, independent from the first communicative connection, to the at least one call recipient device in response to each of the voicemail recording phase indicators;

transmit by a media processing module of a plurality of data streams for playback of the incoming voice message in recording progress to the at least one call recipient device;

receive an interruption indicator from the at least one call recipient device after initiating transmission of the data stream; and establish a two-way communicative connection between the at least one call recipient device and a caller device in response to receipt of the interruption indicator.

22. A non-transitory computer program product, comprising:

processor readable instructions stored in the computer program product, wherein the processor readable instructions are executable by a processor to cause the processor to:

receive voicemail recording phase indicators, wherein each of the voicemail recording phase indicators indicates initiation of a recording phase for a respective one of incoming voice messages by a voicemail server;

select at least one call recipient device from a plurality of call recipient devices in response to each of the voicemail recording phase indicators, wherein each of the plurality of call recipient devices is prioritized in accordance with a call recipient profile;

establish a first communicative connection between the voicemail server and the at least one call recipient device in response to the selection of the at least one call recipient device; and establish a second communicative connection, independent from the first communicative connection, to the at least one call recipient device in response to each of the voicemail recording phase indicators;

receive a plurality of data streams via the first communicative connection, wherein each of the data streams comprises one of the incoming voice messages in recording progress; and transmit the data streams for playback of the incoming voice message in recording progress from a media processing module to the at least one call recipient device;

receive an interruption indicator from the at least one call recipient device after initiating transmission of the data stream; and establish a two-way communicative connection between the at least one call recipient device and a caller device in response to receipt of the interruption indicator.

23. The method of claim 1, wherein a first communication address targeted by the incoming voice message is different than a second communication address associated with the at least one call recipient device.

24. The method of claim 1, wherein the at least one call recipient device comprises at least two call recipient devices and the method further comprises sequentially establishing the communicative connection between the voicemail server and each of the at least two call recipient devices in accordance with at least one of authorization level priorities, order priorities, importance priorities, and time period forwarding priorities, wherein each priority is derived from the call recipient profile.

25. The method of claim 24, wherein establishing the communicative connections are in accordance with all of the authorization level priorities, order priorities, importance priorities, and time forwarding resolve priorities.

26. The method of claim 1, wherein the two-way communicative connection is established directly between the at least one call recipient device and the caller device.

27. The method of claim 1, further comprising selecting between the two-way communicative connection and a three-way connection between the voicemail server, caller device, and the at least one call recipient device.

* * * * *